United States Patent
You et al.

(10) Patent No.: US 11,137,092 B2
(45) Date of Patent: Oct. 5, 2021

(54) DOUBLE-BUCKLE TUBE FOR BATHROOM

(71) Applicant: Youshi (Xiamen) Sanitary Ware Industrial Co., Ltd., Xiamen (CN)

(72) Inventors: Zhangsen You, Xiamen (CN); Hong Yang, Xiamen (CN)

(73) Assignee: Youshi (Xiamen) Sanitary Ware Industrial Co., Ltd., Fujian (CN)

( * ) Notice: Subject to any disclaimer, the term of this patent is extended or adjusted under 35 U.S.C. 154(b) by 107 days.

(21) Appl. No.: 16/560,740

(22) Filed: Sep. 4, 2019

(65) Prior Publication Data

US 2020/0284379 A1    Sep. 10, 2020

(30) Foreign Application Priority Data

Mar. 6, 2019  (CN) .......................... 201920281301.4

(51) Int. Cl.
  *F16L 11/20*    (2006.01)
  *F16L 11/15*    (2006.01)

(52) U.S. Cl.
  CPC .............. *F16L 11/20* (2013.01); *F16L 11/15* (2013.01)

(58) Field of Classification Search
  CPC ................................. F16L 11/20; F16L 11/15
  USPC ......................................................... 138/114
  See application file for complete search history.

(56) References Cited

U.S. PATENT DOCUMENTS

| | | | | |
|---|---|---|---|---|
| 5,931,184 A * | 8/1999 | Armenia | ............... | F16L 39/005 |
| | | | | 137/312 |
| 6,039,066 A * | 3/2000 | Selby | ................ | F16L 35/00 |
| | | | | 137/312 |
| 6,305,407 B1 * | 10/2001 | Selby | ................ | F16L 35/00 |
| | | | | 137/312 |
| 6,446,661 B2 * | 9/2002 | Armenia | ................ | F16L 11/20 |
| | | | | 137/312 |
| 6,546,951 B1 * | 4/2003 | Armenia | ................ | A47L 15/421 |
| | | | | 137/312 |
| 9,719,616 B2 * | 8/2017 | Weh | .................. | F16L 11/10 |
| 10,228,082 B2 * | 3/2019 | De Nora | ............ | F16L 25/0036 |
| 2002/0017330 A1 * | 2/2002 | Armenia | ................ | F16L 11/20 |
| | | | | 138/109 |
| 2004/0134553 A1 * | 7/2004 | Ichimura | ................ | F16L 39/02 |
| | | | | 138/114 |
| 2005/0035597 A1 * | 2/2005 | Bamberger | ........... | F16L 37/091 |
| | | | | 285/340 |
| 2010/0276026 A1 * | 11/2010 | Powell | ................... | F16L 53/32 |
| | | | | 138/114 |

(Continued)

*Primary Examiner* — Craig M Schneider
*Assistant Examiner* — David R Deal
(74) *Attorney, Agent, or Firm* — PROI Intellectual Property US; Klaus Michael Schmid

(57) ABSTRACT

The utility model discloses a double-buckle tube for a bathroom, comprising an outer tube and a flexible inner tube; both ends of the flexible inner tube are respectively provided with connectors; inner ends of the connectors are provided with inner tube connecting parts; the flexible inner tube has elasticity and is expanded and hermetically connected with the inner tube connecting parts by the elasticity; outer ends of the connectors are provided with at least one annular groove; seal rubber rings are arranged in the annular groove; each of the connectors is formed by a tube core and a connecting piece sleeved in the middle of the tube core and fixedly connected with the tube core; and the inner tube connecting parts and the annular groove are respectively arranged on the inner end and the outer end of the tube core.

10 Claims, 7 Drawing Sheets

(56) References Cited

U.S. PATENT DOCUMENTS

2017/0211726 A1* 7/2017 Yan .................. F16L 33/223
2017/0363236 A1* 12/2017 Rose ................. F16L 33/01

* cited by examiner

DOUBLE-BUCKLE TUBE FOR BATHROOM

TECHNICAL FIELD

The utility model relates to a bathroom accessory, and in particular to a double-buckle tube for a bathroom.

BACKGROUND

A tube-in-tube type double-buckle tube sleeved outside a flexible hose body can effectively protect a flexible inner tube to avoid corrosion and aging. Because the double-buckle tube has better bendability, the double-buckle tube can be matched with the inner tube to bend and rotate. The double-buckle tube is flexible in use and is generally applied in connection of waterways of taps, sanitary appliances and showers.

The existing double-buckle tube having a tube-in-tube structure is complicated, has many parts and fittings, and is high in production cost and troublesome in assembling, resulting in low production efficiency of products.

SUMMARY

The utility model aims to provide a double-buckle tube for a bathroom having a tube-in-tube structure.

According to one aspect of the utility model, a double-buckle tube for a bathroom is provided, having a tube-in-tube structure and comprising an outer tube and a flexible inner tube; both ends of the flexible inner tube are respectively provided with connectors; the outer tube is fixedly connected with the side walls of the connectors; a closed isolation space is formed between the outer tube and the flexible inner tube; inner ends of the connectors are provided with inner tube connecting parts; the flexible inner tube has elasticity and is expanded and hermetically connected with the inner tube connecting parts by the elasticity; outer ends of the connectors are provided with at least one annular groove; seal rubber rings are arranged in the annular groove; the seal rubber rings are in interference seal connection with the inner wall of an external water inlet/outlet; each of the connectors is formed by a tube core and a connecting piece sleeved in the middle of the tube core and fixedly connected with the tube core; and the inner tube connecting parts and the annular groove are respectively arranged on the inner end and the outer end of the tube core.

In some embodiments, the connecting piece is in interference connection with the outer tube; the side wall of the connecting piece is provided with a locating ring for preventing the outer tube from being released; and the locating ring has a slope surface facing one side of the flexible inner tube.

In some embodiments, the outer side of the outer tube is also provided with a pressing envelope; and the pressing envelope applies a pressing effect to the outer tube, presses the outer tube and is fixed with the locating ring.

In some embodiments, one end of the outer tube is provided with a movable threaded bushing; the inner wall of the outer side of the threaded bushing is provided with an internal thread; a corresponding end of the connecting piece is provided with a blocking ring; and the blocking ring is located inside the threaded bushing for blocking the threaded bushing from separating from the outer tube through the blocking ring.

In some embodiments, the side wall of the outer end of the connecting piece at another end opposite to the threaded bushing is provided with an external thread.

In some embodiments, the outer side of the blocking ring is provided with a gasket. In some embodiments, the outer tube is a metal corrugated hose or a metal braided hose.

In some embodiments, the tube core penetrates through the connecting piece and is in interference connection with the connecting piece.

In some embodiments, the connecting piece is riveted and fixed with the tube core. Compared with the prior art, the double-buckle tube for a bathroom adopting the above technical solution has the following beneficial effects: the tube-in-tube structure divides the connectors used for fixing the flexible inner tube into a tube core and a connecting piece, wherein the tube core is connected with the flexible inner tube into a whole, while the outer tube is connected with the connecting piece. While the pressing envelope applies a pressing effect to the outer tube, presses the outer tube and is fixed with the locating ring, the connecting piece and the tube core can be riveted and fixed. Thus, the outer tube and the flexible inner tube can be respectively assembled with the connecting piece and the tube core, and then pressed, riveted and fixed. The assembly is quick and convenient, and production efficiency of products is increased. The double-buckle tube for a bathroom has simple structure, low manufacture cost and firm fixation.

DETAILED DESCRIPTION

The utility model is further described in detail below in combination with the drawings.

Figure 1:
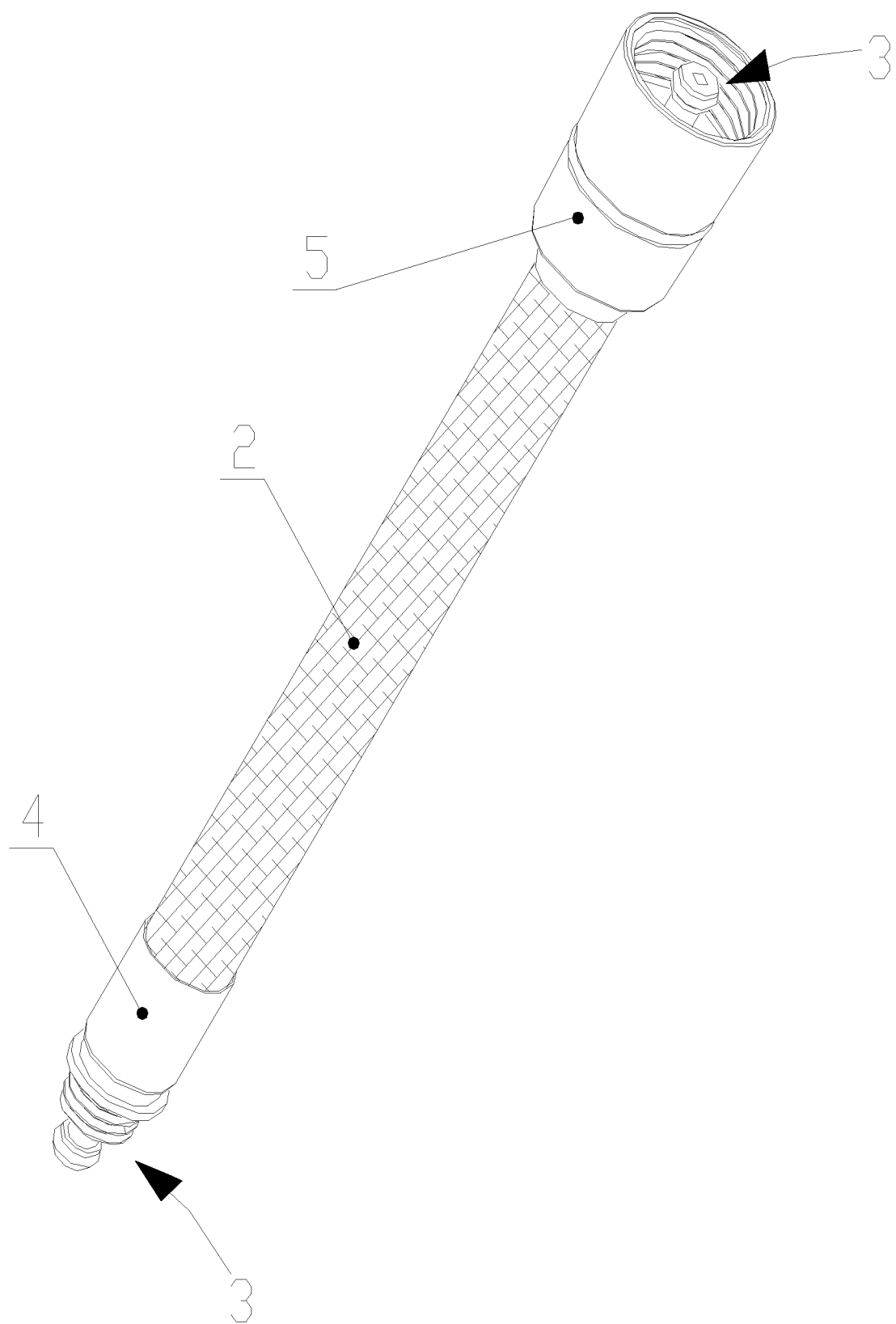
FIG. 1 is a structural schematic diagram of a double-buckle tube for a bathroom in an embodiment of the utility model.
Figure 2:
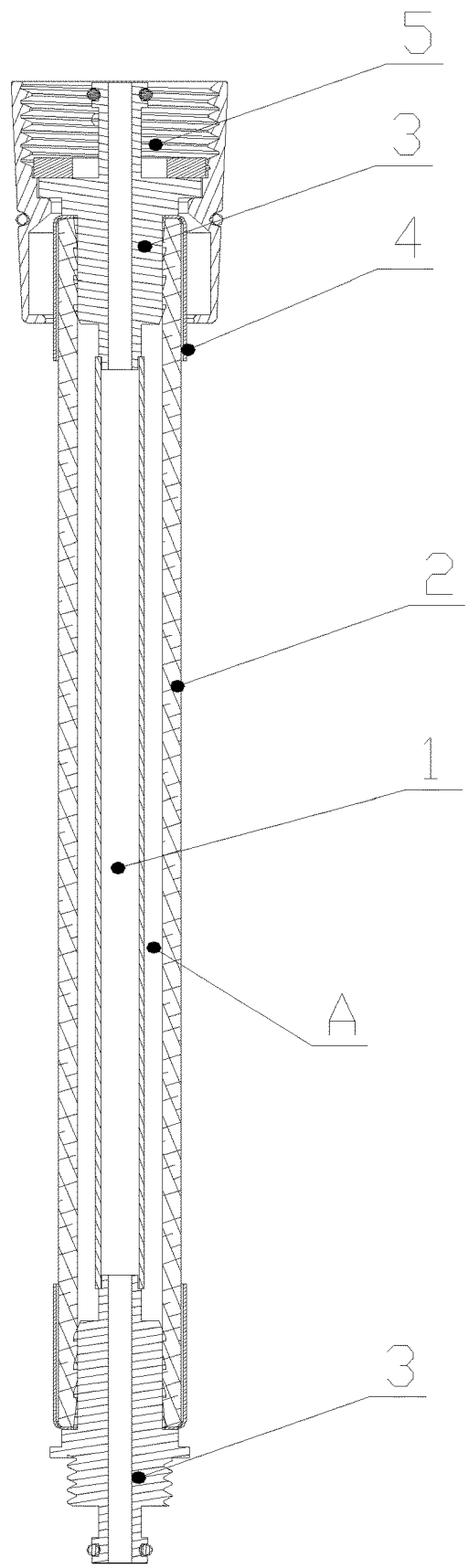
FIG. 2 is a sectional view of a double-buckle tube for a bathroom shown in FIG. 1.
Figure 3:
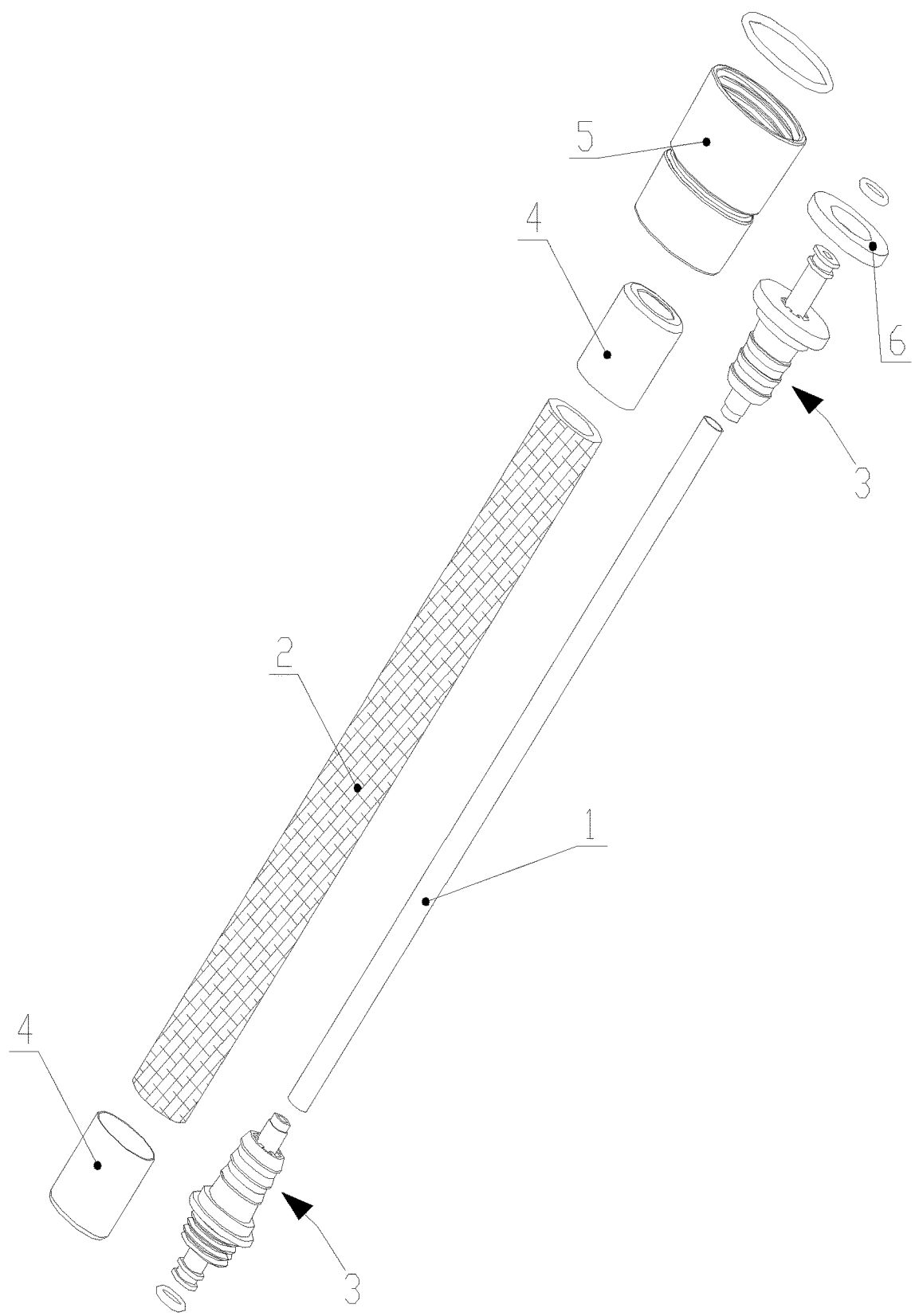
FIG. 3 is an assembly diagram of a double-buckle tube for a bathroom shown in FIG. 1.
Figure 4:
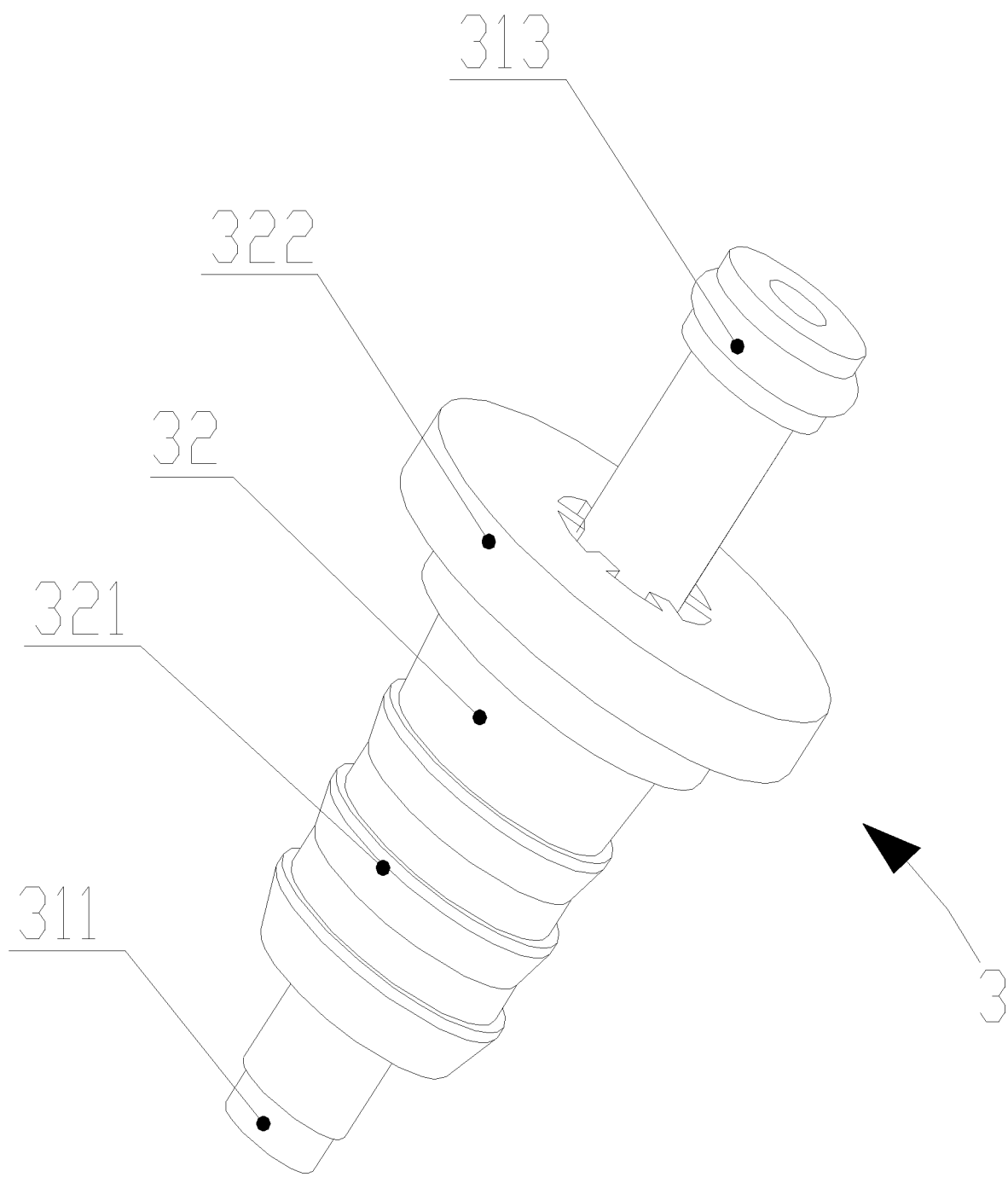
FIG. 4 is a structural schematic diagram of a connector on a threaded bushing side shown in FIG. 3.
Figure 5:
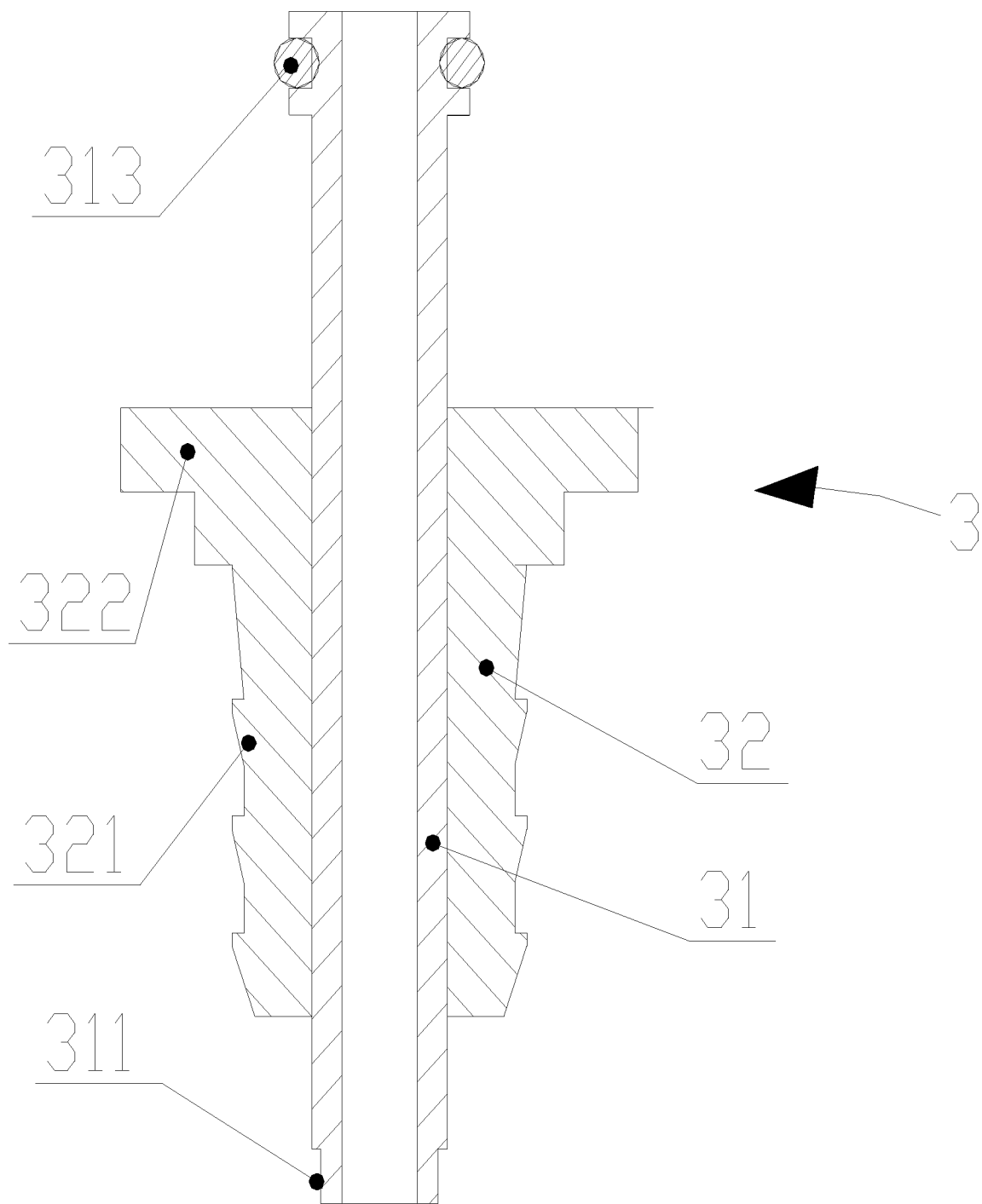
FIG. 5 is a sectional view of a connector shown in FIG. 4.
Figure 6:
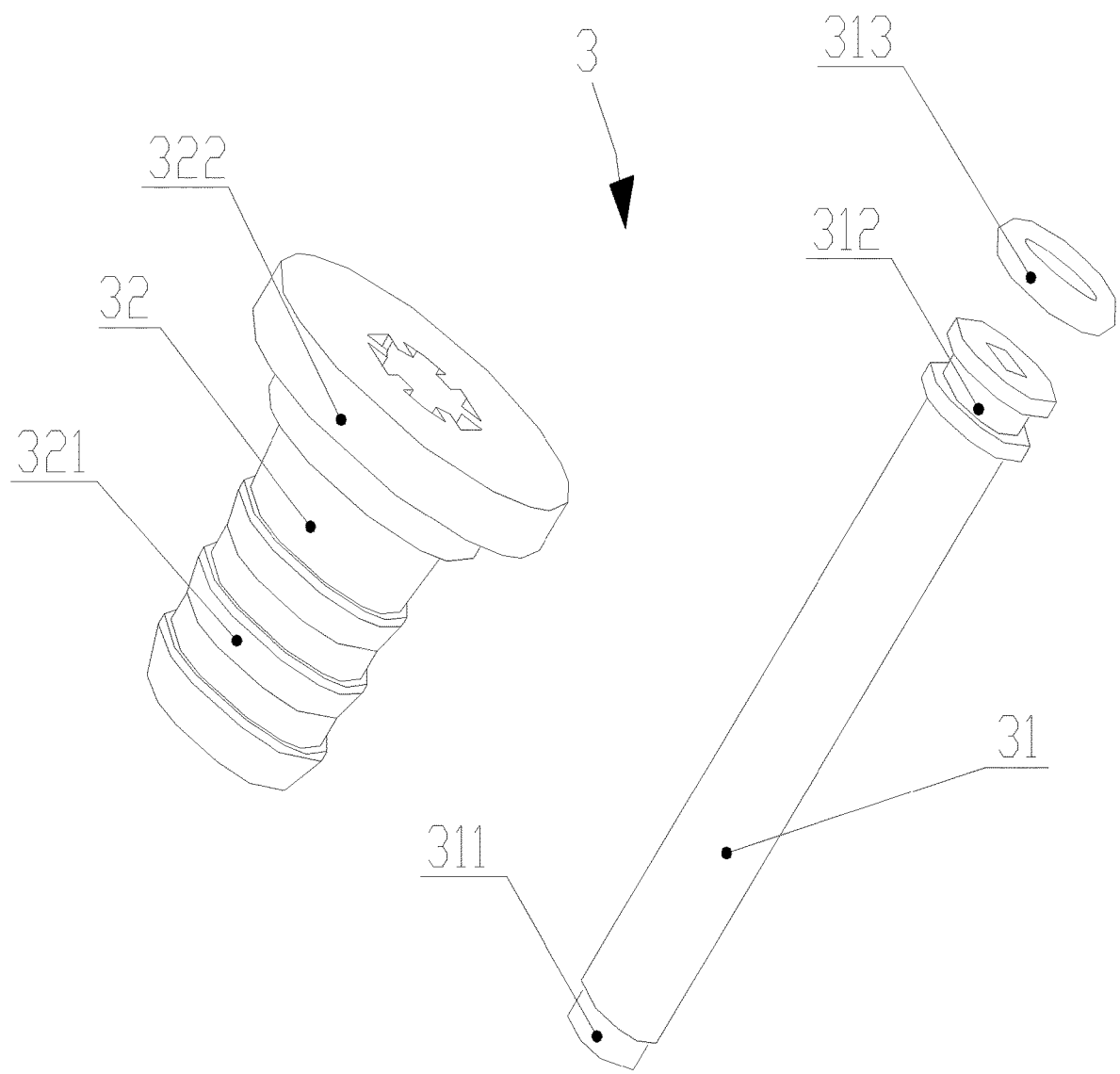
FIG. 6 is an assembly diagram of a connector shown in FIG. 4.
Figure 7:
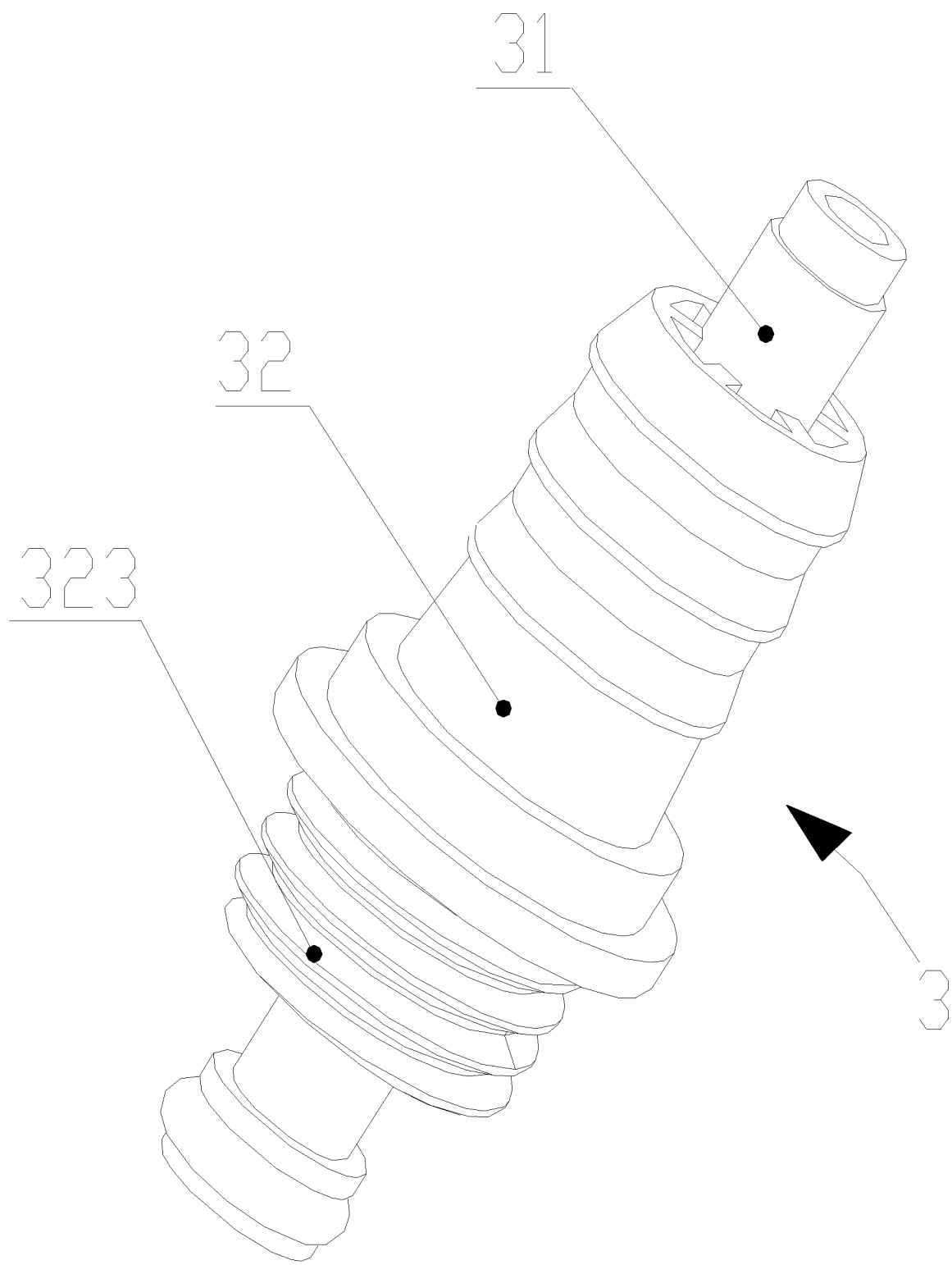
FIG. 7 is a structural schematic diagram of a connector on another side opposite to a threaded bushing shown in FIG. 3.

FIG. 1 to FIG. 7 schematically show a double-buckle tube for a bathroom according to one embodiment of the utility model. As shown in the figures, the device has a tube-in-tube structure and comprises an outer tube 2 and a flexible inner tube 1.

Both ends of the flexible inner tube 1 are respectively provided with connectors 3.

The outer tube 2 is fixedly connected with the side walls of the connectors 3.

A closed isolation space A is formed between the outer tube 2 and the flexible inner tube 1.

Inner ends of the connectors 3 are provided with inner tube connecting parts 311. The flexible inner tube 1 has elasticity and is expanded and hermetically connected with the inner tube connecting parts 311 by the elasticity.

Outer ends of the connectors 3 are provided with at least one annular groove 312. Seal rubber rings 313 are arranged in the annular groove 312.

The seal rubber rings 313 are in interference seal connection with the inner wall of an external water inlet/outlet.

Each of the connectors 3 is formed by a tube core 31 and a connecting piece sleeved in the middle of the tube core 31 and fixedly connected with the tube core 31.

Specifically, the tube core 31 penetrates through the connecting piece 32 and is in interference connection with the connecting piece 32.

Preferably, the connecting piece 32 and the tube core 31 are copper members. The connecting piece 32 is riveted and fixed with the tube core 31.

The inner tube connecting parts 311 and the annular groove 312 are respectively arranged on the inner end and the outer end of the tube core 31.

The connecting piece 32 is in interference connection with the outer tube 2.

The side wall of the connecting piece 31 is provided with a locating ring 321 for preventing the outer tube 2 from being released.

The locating ring 321 has a slope surface facing one side of the flexible inner tube 1.

The outer side of the outer tube 2 is also provided with a pressing envelope 4.

The pressing envelope 4 applies a pressing effect to the outer tube 2, presses the outer tube 2 and is fixed with the locating ring 321.

In the present embodiment, one end of the outer tube 2 is provided with a movable threaded bushing 5.

The inner wall of the outer side of the threaded bushing 5 is provided with an internal thread.

A corresponding end of the connecting piece 32 is provided with a blocking ring 322.

The blocking ring 322 is located inside the threaded bushing 5 for blocking the threaded bushing 5 from separating from the outer tube 2 through the blocking ring 322.

The side wall of the outer end of the connecting piece 32 at another end opposite to the threaded bushing 5 is provided with an external thread 323.

In the present embodiment, the outer side of the blocking ring 322 is also provided with a gasket 6.

The outer tube 2 is generally a metal corrugated hose or a metal braided hose.

The assembling process of the double-buckle tube for a bathroom in the present embodiment is as follows:

(1) Two tube cores 31 are respectively inserted into both ends of the flexible inner tube 1, and are sealed and fixed.

(2) One threaded bushing 5 and two pressing envelopes 4 are sleeved on the outer tube 2. Opening parts of the two pressing envelopes 4 are opposite. Connecting pieces 32 are respectively inserted into both ends of the outer tube 2. The connecting piece 32 at one end that faces the opening of the threaded bushing 5 has the blocking ring, and the other connecting piece 32 is provided with an external thread 323. The locating rings 321 of the two connecting pieces 32 are inserted into the outer tube 2 as much as possible.

(3) The flexible inner tube 1 provided with the tube core 31 is inserted through the connecting piece 32 and penetrates through the outer tube 2. The connecting pieces 32 on both ends are respectively located in the middle of the tube core 31. Top ends of the tube cores 31 on both ends extend from the connecting pieces 32.

(4) The pressing envelopes 4 and the connecting pieces 32 are simultaneously pressed by using a clamp to deform the pressing envelopes 4 and the connecting pieces 32 inwards. The inside diameters are decreased, so as to realize riveting and fixation.

(5) The assembly of the installed gasket 6 and the seal rubber rings 313 is completed.

Compared with the prior art, the double-buckle tube for a bathroom adopting the above technical solution has the following beneficial effects: the tube-in-tube structure divides the connectors used for fixing the flexible inner tube into a tube core and a connecting piece, wherein the tube core is connected with the flexible inner tube into a whole, while the outer tube is connected with the connecting piece. While the pressing envelope applies a pressing effect to the outer tube, presses the outer tube and is fixed with the locating ring, the connecting piece and the tube core can be riveted and fixed. Thus, the outer tube and the flexible inner tube can be respectively assembled with the connecting piece and the tube core, and then pressed, riveted and fixed. The assembly is quick and convenient, and production efficiency of products is increased. The double-buckle tube for a bathroom has simple structure, low manufacture cost and firm fixation.

The above only describes some embodiments of the utility model. For those ordinary skilled in the art, several deformations and improvements can also be made without departing from the concept of the present invention, all of which belong to the protection scope of the utility model.

What is claimed is:

1. A double-buckle tube for a bathroom, having a tube-in-tube structure, wherein that the double-buckle tube comprises an outer tube and a flexible inner tube; both ends of the flexible inner tube are respectively provided with connectors; the outer tube is fixedly connected with side walls of the connectors; a closed isolation space is formed between the outer tube and the flexible inner tube; inner ends of the connectors are provided with inner tube connecting parts; the flexible inner tube has elasticity and is expanded and hermetically connected with the inner tube connecting parts by the elasticity; outer ends of the connectors are provided with at least one annular groove; seal rubber rings are arranged in the at least one annular groove; the seal rubber rings are in interference seal connection with an inner wall of an external water inlet/outlet; each of the connectors is formed by a tube core and a connecting piece sleeved in a middle of the tube core and fixedly connected with the tube core; and the inner tube connecting parts and the at least one annular groove are respectively arranged on an inner end and an outer end of the tube core.

2. The double-buckle tube for a bathroom according to claim 1, wherein that the connecting piece is in interference connection with the outer tube; a side wall of the connecting piece is provided with a locating ring for preventing the outer tube from being released; and the locating ring has a slope surface facing one side of the flexible inner tube.

3. The double-buckle tube for a bathroom according to claim 2, wherein that an outer side of the outer tube is also provided with a pressing envelope; and the pressing envelope applies a pressing effect to the outer tube, presses the outer tube and is fixed with the locating ring.

4. The double-buckle tube for a bathroom according to claim 1, wherein that one end of the outer tube is provided with a movable threaded bushing; an inner wall of an outer side of the threaded bushing is provided with an internal thread; a corresponding end of the connecting piece is provided with a blocking ring; and the blocking ring is located inside the threaded bushing for blocking the threaded bushing from separating from the outer tube through the blocking ring.

5. The double-buckle tube for a bathroom according to claim 4, wherein that a side wall of an outer end of the connecting piece at another end opposite to the threaded bushing is provided with an external thread.

6. The double-buckle tube for a bathroom according to claim 5, wherein that an outer side of the blocking ring is provided with a gasket.

7. The double-buckle tube for a bathroom according to claim 1, wherein that the outer tube is a metal corrugated hose or a metal braided hose.

8. The double-buckle tube for a bathroom according to claim 1, wherein that the tube core penetrates through the connecting piece and is in interference connection with the connecting piece.

9. The double-buckle tube for a bathroom according to claim 8, wherein that the connecting piece is riveted and fixed with the tube core.

10. The double-buckle tube for a bathroom according to claim 1, wherein that the inner tube connecting parts and the at least one annular groove are arranged two opposite ends of the tube core, the inner tube connecting parts are arranged on an inner surface of the tube core, and the at least one annular groove is arranged on an outer surface of the tube core.

\* \* \* \* \*